United States Patent
Rocher

(10) Patent No.: US 8,366,351 B2
(45) Date of Patent: Feb. 5, 2013

(54) METHOD OF MAKING AN UNDERSEA PIPE INCLUDING ANTICORROSION LININGS AND WELDS

(75) Inventor: Xavier Rocher, Chatou (FR)

(73) Assignee: Saipem S.A., Montigny le Bretonneux (FR)

( * ) Notice: Subject to any disclaimer, the term of this patent is extended or adjusted under 35 U.S.C. 154(b) by 606 days.

(21) Appl. No.: 12/442,272

(22) PCT Filed: Sep. 18, 2007

(86) PCT No.: PCT/FR2007/051955
§ 371 (c)(1),
(2), (4) Date: Mar. 20, 2009

(87) PCT Pub. No.: WO2008/037907
PCT Pub. Date: Apr. 3, 2008

(65) Prior Publication Data
US 2010/0028085 A1 Feb. 4, 2010

(30) Foreign Application Priority Data
Sep. 27, 2006 (FR) ...................................... 06 53972

(51) Int. Cl.
*F16L 1/12* (2006.01)
*F16L 55/00* (2006.01)
(52) U.S. Cl. ........... 405/170; 405/166; 405/211; 285/55
(58) Field of Classification Search ................... 405/166, 405/167, 169, 170, 211; 285/55
See application file for complete search history.

(56) References Cited

U.S. PATENT DOCUMENTS

| 4,366,971 A | * | 1/1983 | Lula ................................. 285/55 |
| 5,001,320 A | * | 3/1991 | Conley et al. .................... 219/61 |
| 5,009,737 A | * | 4/1991 | Lescaut .......................... 156/264 |
| 6,179,523 B1 | | 1/2001 | Langner et al. |
| 7,722,085 B2 | * | 5/2010 | Pionetti ........................... 285/55 |
| 2002/0038954 A1 | | 4/2002 | Andreoli |
| 2007/0284872 A1 | * | 12/2007 | Pionetti ........................... 285/55 |

FOREIGN PATENT DOCUMENTS

| FR | 2564938 | 11/1985 |
| FR | 2876773 | 4/2006 |

OTHER PUBLICATIONS

International Search Report, PCT/FR2007/051955, Sep. 18, 2007, Saipem S.A. etc.

* cited by examiner

*Primary Examiner* — Tara Mayo-Pinnock
(74) *Attorney, Agent, or Firm* — Cozen O'Connor

(57) ABSTRACT

A method of making steel undersea pipes designed to convey corrosive fluids including water, the method including acting in a workshop on land to assemble together respective ends of at least two unitary pipe elements with carbon-steel first welds to form pipe strings, the first welds being protected by first linings, and acting at sea from a laying ship to assemble together respective ends of the strings by use of anti-corrosion second welds of stainless steel or of anti-corrosion alloy to form a pipe. Each of the ends of the strings are provided with an anti-corrosion cladding which extends over the inside surface made of carbon steel of each end unitary pipe element over a first length of at least 4 times the thickness of the wall of the pipe.

26 Claims, 7 Drawing Sheets

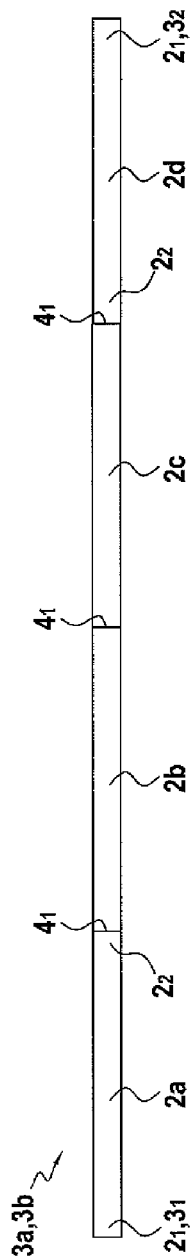
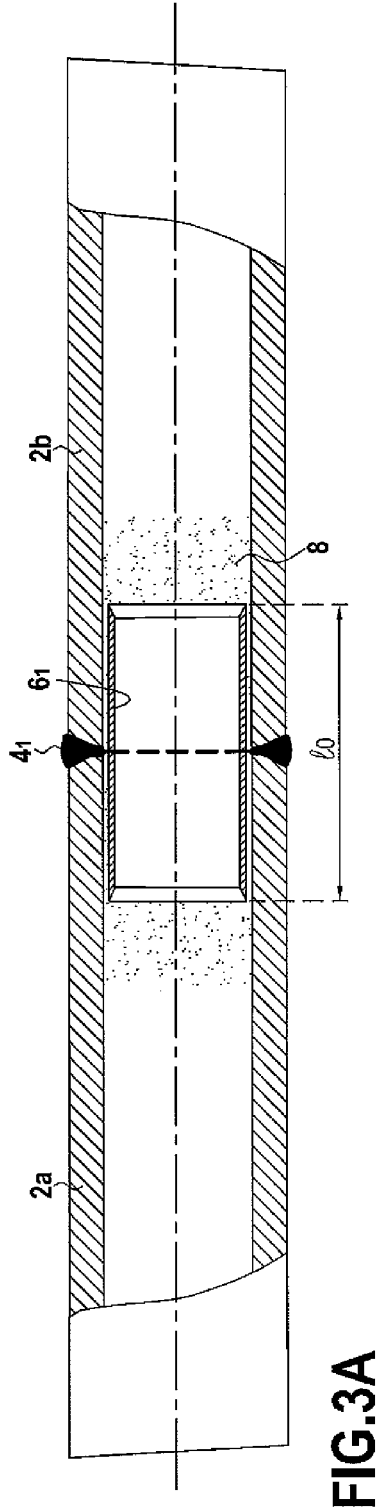
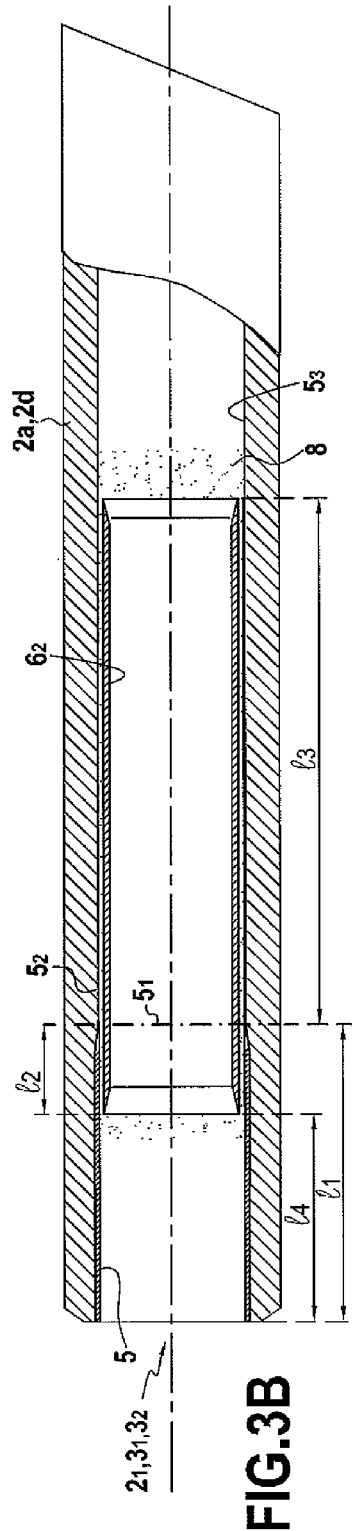
FIG.3
FIG.3A
FIG.3B

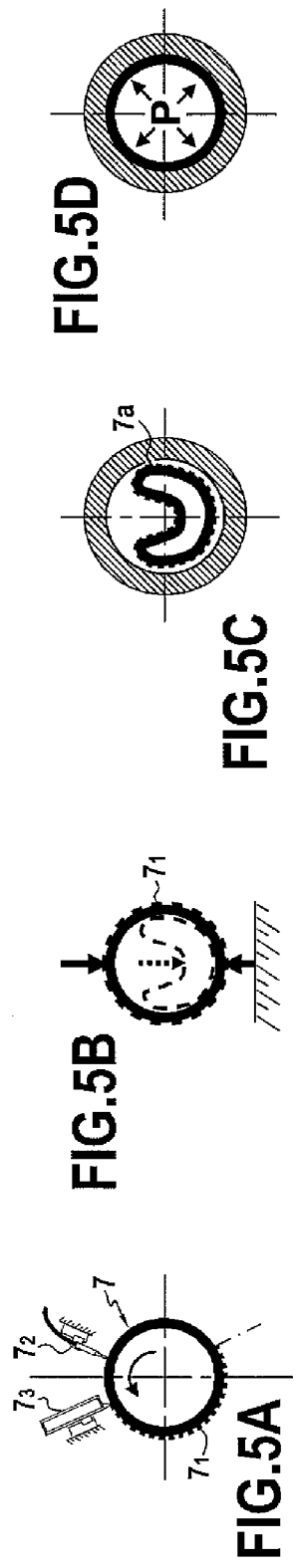
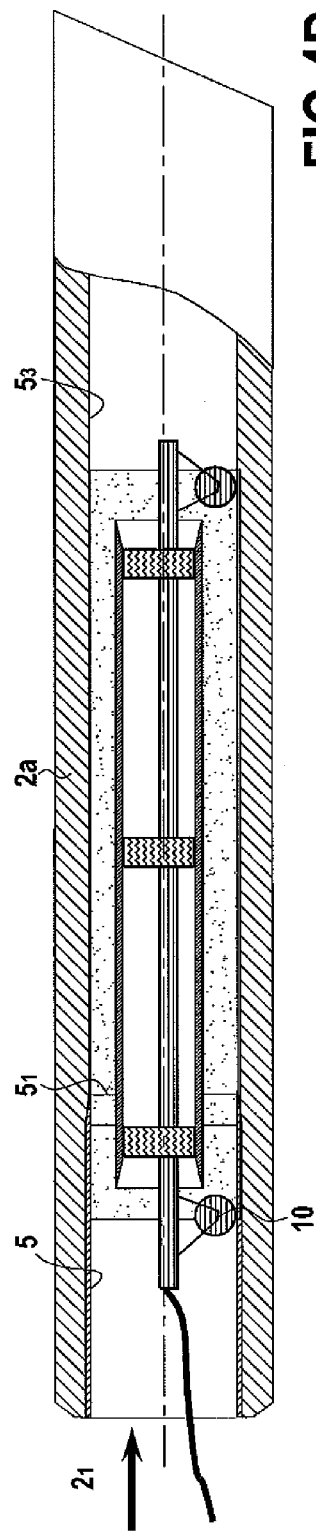
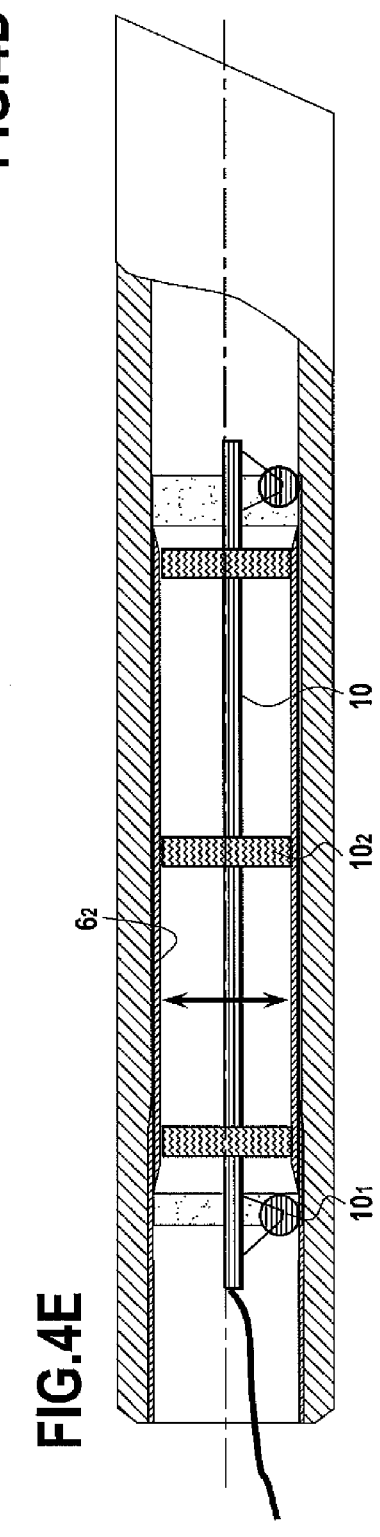

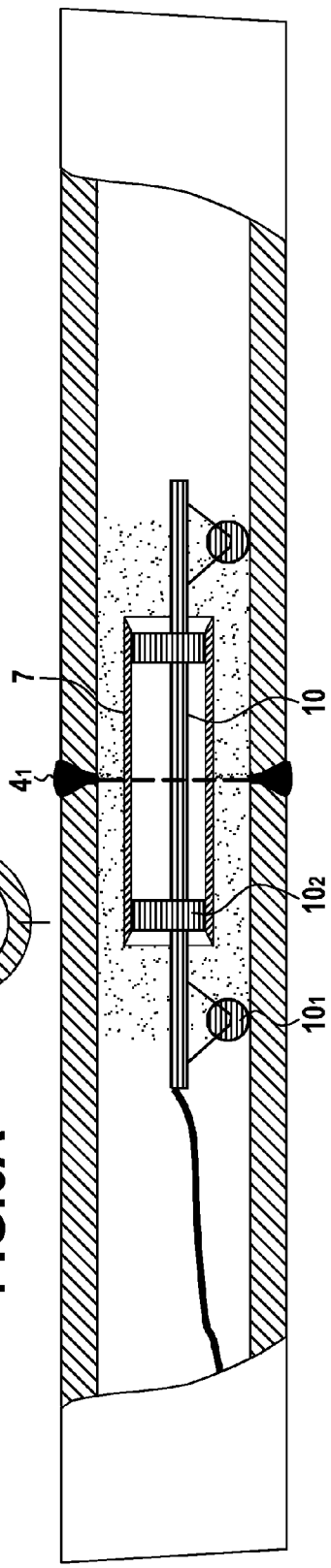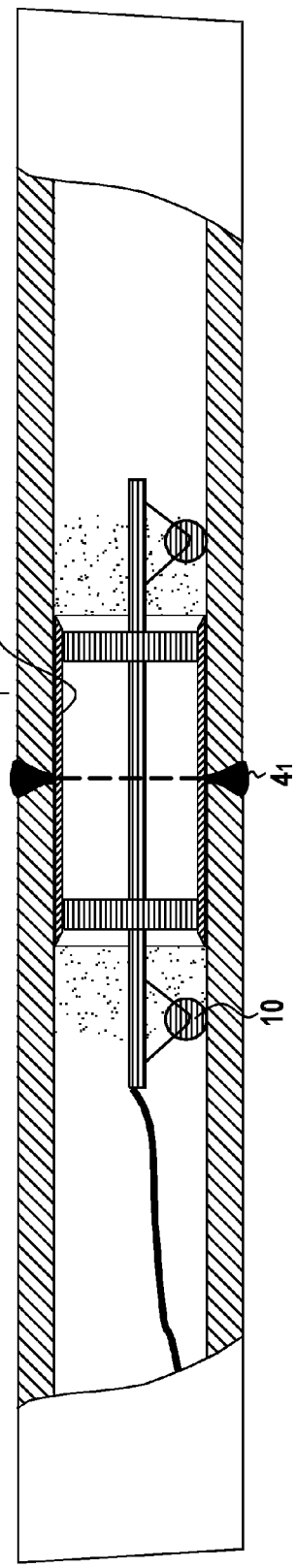

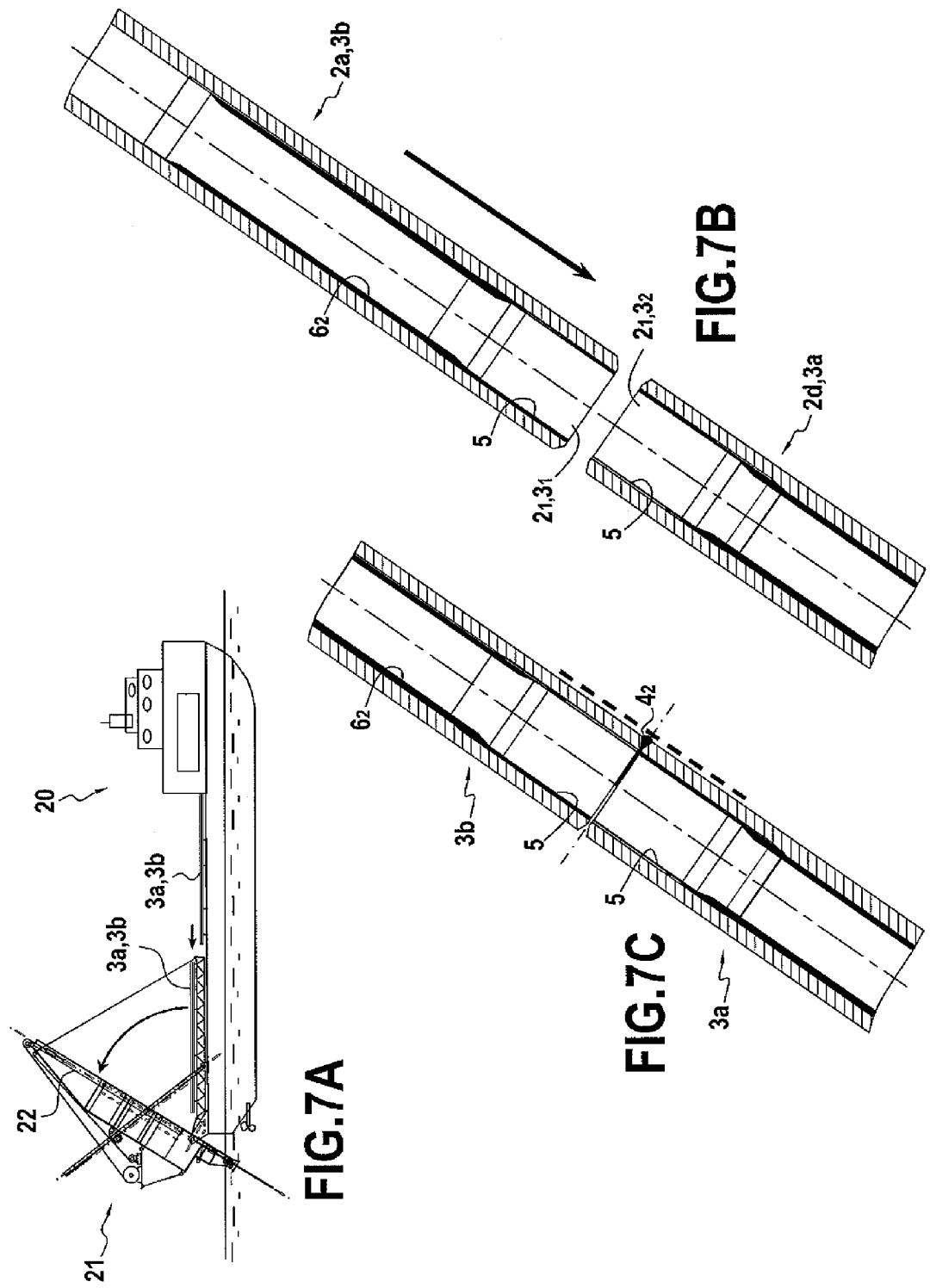

METHOD OF MAKING AN UNDERSEA PIPE INCLUDING ANTICORROSION LININGS AND WELDS

PRIORITY CLAIM

This is a U.S. national stage of application No. PCT/FR07/051955, filed on Sep. 18, 2007. Priority is claimed on the following application(s): Country: France, Application No.: 0653972, Filed: Sep. 27, 2006, the content of which is incorporated here by reference.

FIELD OF THE INVENTION

The present invention relates to a method of making undersea pipes designed to convey corrosive fluids, and in particular water, such a method comprising assembling unitary pipe elements together by welding.

The present invention relates more particularly to installing a bottom-to-surface link comprising at least one undersea pipe forming a link between a floating support and the sea bottom, in particular at great depth. Such undersea pipes are known as "risers" as explained below, said risers being made up of unitary tubular elements that are welded together end-to-end and that are made of steel.

More particularly, the present invention relates to an undersea pipe of the riser type forming a link between a floating support and the sea bottom, said riser being constituted by a rigid pipe of the catenary type extending from said floating support to a point of contact on the sea bottom.

The technical sector of the invention is thus the field of manufacturing and installing bottom-to-surface production links for under-sea extraction of petroleum oil, of gas, or of some other soluble or meltable material, or of a suspension of inorganic matter, from an underwater wellhead for developing production fields installed offshore in deep water. The main and immediate use of the invention is in the field of petroleum oil production, and in water reinjection or gas production or reinjection.

BACKGROUND OF THE INVENTION

In general, a floating support has anchor means for remaining in position in spite of the effects of currents, of winds, and of swell. In general, it also has means for drilling, for storing, and for processing petroleum oil, and means for offloading to offload tankers that call at regular intervals to offload the production. Such floating supports are known as "Floating Production, Storage & Offloading" units, referred to below as "FPSO units", or, when the floating supports are also used to perform drilling operations on a well that is deflected in the depth of the water, such supports are known as Floating Drilling & Production Units" or "FDPUs".

A riser of the invention can be a crude-oil or gas "production riser", or a water injection riser, forming a link with an undersea pipe lying on the sea bottom, or indeed a "drilling riser" forming link between the floating support and a wellhead located on the sea bottom.

In FPSO units in which, in general, a multiplicity of lines are installed, the links implemented are either of the hybrid tower bottom-to-surface type, or of the catenary type.

When the bottom-to-surface link pipe is of the catenary type, it forms a direct link between a floating support and a contact point on the sea bottom that is offset relative to the axis of said support, with said pipe taking up a "catenary" configuration under its own weight, thereby forming a curve whose radius of curvature decreases going from the surface to the contact point on the sea bottom, and the axis of said pipe forms an angle α with the vertical of value that varies, in general, from 10-to-20 degrees at the floating support to, ideally, 90 degrees at the sea bottom, corresponding to an ideal position that is substantially tangential to the horizontal, as explained below.

Catenary-type links are generally formed by means of flexible pipes, but they are of extremely high cost due to the complex structure of the pipe.

Therefore, substantially vertical risers have been developed in order to have the flexible link of catenary configuration close to the surface, in the vicinity of the floating support, thereby making it possible to minimize the length of said flexible pipe, and to minimize the forces that are applied to it, thereby also considerably reducing its cost.

In addition, for petroleum oil production, since the crude oil is conveyed over distances that are very long, several kilometers, it is desirable to provide an extreme level of insulation for them, firstly so as to minimize the increase in viscosity that reduces the hourly output of the well, and secondly so as to avoid the flow becoming blocked by paraffin being deposited or by hydrates forming whenever the temperature goes down to a value approximately in the range 30° C. to 40° C. Such phenomena are even more critical when the sea bottom temperature is about 4° C. and the crude oil is of the paraffinic type, as applies, in particular, off West Africa.

Whenever the depth of water reaches and exceeds in the range 800 meters (m) to 1000 m, it becomes possible to form said bottom-to-surface link by means of a rigid pipe having a thick wall because, since the length of the pipe is considerable, its flexibility makes it possible to obtain a catenary configuration that is satisfactory while remaining within acceptable stress limits.

Such rigid risers made of strong materials of large thickness and disposed in catenary configurations are commonly known as "Steel Catenary Risers" and are referred to in the present description as "SCRs", regardless of whether they are made of steel or of some other material such as a composite material.

Such catenary risers or "SCRs" are much simpler to make than flexible pipes, and are thus less expensive.

The geometrical curve formed by a pipe of uniform weight in suspension subjected to gravity, and referred to as a "catenary" is a mathematical function of the hyperbolic cosine type (cos hx=($e^x+e^{-x}$)/2, relating the abscissa and the ordinate of any point of the curve using the following formulae:

$$y=R_0(\cos h(x/R_0)-1)$$

$$R=R_0(y/R_0+1)^2$$

where:

x represents the distance in the horizontal direction between said contact point and a point M of the curve;

y represents the altitude of the point M (x and y are thus the abscissa and the ordinate of a point M of the curve relative to a rectangular frame of reference whose origin is at said contact point);

$R_0$ represents the radius of curvature at said contact point, i.e. at the point of horizontal tangency; and R represents the radius of curvature at point M (x,y).

Thus, the curvature varies along the catenary from the surface, where its radius has a maximum value $R_{max}$, to the contact point, where its radius has a minimum value $R_{min}$ (or $R_0$ in the above formula). Under the effect of waves, of wind, and of current, the surface support moves laterally and vertically, thereby lifting the catenary-shaped pipe off the sea bottom and putting it back down thereon.

Thus, the pipe has a radius of curvature that is at its maximum at the top of the catenary, i.e. at the point where it is suspended from the FPSO unit. Said maximum radius of curvature is, in general, at least 1500 m, and in particular lies in the range 1500 m to 5000 m, and said radius of curvature decreases going from said top down to the point of contact with the bottom. At this location, the radius of curvature is at its minimum in the portion that is in suspension. However, in the adjacent portion lying on the sea bottom, and since said pipe is ideally in a straight line, the radius of curvature is theoretically infinite. In fact, said radius is not infinite, because some residual curvature remains, but it is extremely high.

Thus, as the floating support moves on the surface, the contact point moves forwards and backwards and, in the zone in which the pipe is lifted off or put back down on the bottom, the radius of curvature goes successively from a minimum value $R_{min}$ to an extremely high value, or even to infinity for an ideal configuration in which the undersea pipe lies on the sea bottom substantially in a straight line.

This alternating bending gives rise to fatigue phenomena that are concentrated throughout the catenary foot zone and the lifespan of such pipes is greatly reduced and is, in general incompatible with the lifespans desired for bottom-to-surface links, i.e. in the range 20 years to 25 years, or even longer.

In addition, during such alternating movements of the contact point, it is observed that the stiffness of the pipe, associated with the above-mentioned residual curvature, acts, over time, to cause a furrow to be dug over the entire length lifted off and then put back down again, and to cause a transition zone to be formed in which there exists a point of inflection at which the radius of curvature, which is at its minimum at the foot of the centenary, then changes sign in said transition zone, and increases to reach, ultimately, an infinite value in the portion of undersea pipe that is lying in a straight line on the sea bottom.

In poorly-consolidated soil of the type commonly encountered at great depths, such repeated movements over long periods form a furrow that is particularly deep and the effect of this is to change the curvature of the catenary and, if the phenomenon becomes larger, to give rise to risks of the pipes being damaged, either in the undersea pipes lying on the sea bottom, or in the SCRs linking said undersea pipes lying on the sea bottom to the surface.

The most critical portion of the catenary is thus situated in its portion close to the contact point, and, in fact, most of the forces in this low portion of the catenary are generated by the movements of the floating support itself and by the excitations that occur in the high portion of the catenary that is subjected to current and to swell, all of these excitations then propagating mechanically all the way along the pipe to the foot of the catenary.

In this catenary foot zone, pipes are made of steels that are selected to withstand fatigue throughout the life of an installation, but the welds between pipe elements constitute weak spots when said pipe conveys either water, or fluids including water, and more particularly saltwater. In the presence of water, said welds are subjected to corrosion phenomena that, over time, and under variable bending stresses, give rise to incipient cracks that lead to the ruin of said pipe.

In order to mitigate that problem, welds are formed between pipe elements by means of a stainless steel or of a corrosion-resistant alloy. Anti-corrosion alloys are well known to the person skilled in the art. They are mainly alloys based on nickel, in particular of the Inconel type, and preferably of a particular grade, in particular Inconel 625 or 825, which Inconels also offer excellent fatigue strength due to their high elastic limits and thus make it possible to achieve lifespans lying in the range 20 years to 30 years.

However, in order to enable the welding to be performed under good conditions, it is necessary to clad the insides of the two pipe elements that are to be welded together with the same stainless steel or corrosion-resistant alloy over a few centimeters (cm) at the ends of those pipe elements, so that the weld penetration pass that is to constitute the future wall in contact with the fluid is of the same metal as the filler metal of the weld, in particular of Inconel. That cladding of stainless steel or of anti-corrosion alloy, in particular of the Inconel type, is formed by a costly electric arc method known as "cladding" that is generally implemented using a Tungsten Inert Gas (TIG) welding method associated with a filler rod of stainless steel or of corrosion-resistant alloy.

That portion of the inside surface of the pipe that is clad with stainless steel or with anti-corrosion alloy of the Inconel type gives rise to a major problem for the weld inspection that is performed from the outside using scanning acoustic means to obtain very precise mapping of defects in the weld. The TIG method is highly localized and high-energy, and the weld pool of molten parent steel and of molten alloy gives rise to undulations at the interface between the two metals, thereby making any inspection by ultrasound almost impossible. During ultrasound inspection, such undulations at the interface being the two metals generate echoes that make it almost impossible to use the results in practice, and thus to show the locations of the defects, and, as a result, prevent the quality of the weld between the two pipe elements from being determined.

The portion of the inside surface of the pipe that is clad with stainless steel or with anti-corrosion alloy of the Inconel type gives rise to another major problem at the inside wall of the pipe that is in contact with the fluid, and more particularly in the transition zone in which the metal of the wall changes, i.e. where it changes between the conventional carbon steel of the main portion of the pipe element and the stainless steel or anti-corrosion alloy of the Inconel type. In said transition zone, and in the presence of water, a phenomenon occurs whereby the ordinary steel in contact with the water is subjected to electrochemical corrosion, i.e. to galvanic corrosion or "dissimilar-metal corrosion", that locally generates corrosion spots in the steel in contact with the water in the vicinity of the stainless steel or of the anti-corrosion alloy, and that can give rise to cracking under repeated bending stresses, and the resulting cracks are totally unacceptable if the pipe is to offer good fatigue endurance.

That type of anti-corrosion weld is thus not only difficult to achieve, in particular when the pipe is assembled by welding on a laying ship at sea, but it is also unsatisfactory because it cannot be inspected reliably by conventional ultrasound testing, and it gives rise to phenomena of corrosion of the steel of the inside surface of the pipe in the proximity of the weld.

Methods are also known for protecting the steel inside surface of the pipe from corrosion by implementing a continuous lining by means of a flexible cladding or "liner" made of thermoplastic materials. Unfortunately, such linings are also costly and complex to implement because they require, in particular, anchoring at the ends by means of ferrules or sleeves so that the lining stays in place while the pipe is conveying a fluid at high pressure. Those sleeves are also complex and costly to put in place. In addition, the ends of the strings or elements of pipe to be assembled together by welding must not be pre-clad with said lining because such a lining cannot withstand the high temperatures implemented during welding operations. Finally, such continuous internal linings require lining thicknesses lying at least in the range 10 millimeters (mm) to 15 mm, which represents a very substantial decrease in the inside diameter of the pipe, and thus gives rise to additional head loss of the fluid conveyed inside the pipe in operation.

OBJECT AND SUMMARY OF THE INVENTION

An object of the present invention is to provide a method of laying undersea pipes for conveying corrosive fluids and in particular water, the method comprising assembling strings of undersea pipes together by welding from an undersea pipe laying ship at sea, which method:

is reliable in terms of corrosion resistance at its welds, and in particular does not present any risk, in operation, of dissimilar-metal corrosion inside the pipe; and is reliable in terms of fatigue resistance at each of the welds; and affects as little as possible the strength performance and/or increases as little as possible the head loss of the fluid conveyed inside the pipe in operation; and is simple and as inexpensive as possible to implement, and in particular includes as few assembly steps and in particular welding steps as possible on board the laying ship.

To this end, the present invention provides a method of making steel undersea pipes designed to convey corrosive fluids and in particular water, the method comprising the steps consisting in:

1) acting in a workshop on land to assemble together respective ends of at least two unitary pipe elements by means of first welds so as to form pipe strings; and:

2) acting at sea from a laying ship to assemble together respective ends of said strings by means of second welds so as to form a said pipe;

said method being characterized in that:

in step 1):

said strings are made from at least two end unitary pipe elements, each of which has a first end designed to constitute one of the two ends of a said string;

an anti-corrosion cladding made of stainless steel or of a corrosion-resistant alloy, preferably an alloy based on nickel, extending over the inside surface made of carbon steel of each said end unitary pipe element over a first length of at least 4 times the thickness of the wall of the pipe, and preferably in the range 4 times to 20 times said thickness of the wall of the pipe, from said first end towards the second end of the end unitary pipe element;

the inside surface of the remainder of each end unitary pipe element to its second end being made of a carbon steel that is not clad with a said stainless steel or with a said corrosion-resistant alloy; and said second ends being assembled together by carbon-steel first welds; and prior to step 2), at least one first partial lining of the inside surface of said string is implemented by means of a tubular liner made of a flexible plastics material that is applied against said inside surface of the string, each said first lining covering each said carbon-steel first weld between the respective ends of the unitary pipe elements of the same string whose inside surface is made of the same carbon steel not clad with a said stainless steel or with a said corrosion-resistant alloy; and in step 2), said first ends are assembled together by second welds consisting of welds performed with the same said stainless steel or with the same said corrosion-resistant alloy, preferably an alloy based on nickel.

In a preferred implementation of the method of the invention, prior to step 2), and preferably prior to step 1), second partial linings are implemented by means of tubular liners made of flexible plastics material that are applied against said inside surface of the pipe element, each of said second linings covering the line of contact between firstly said anti-corrosion cladding of stainless steel or of corrosion-resistant alloy and secondly the carbon steel that is not clad with a said anti-corrosion cladding of that portion of the inside surface of the unitary pipe element that is adjacent to said anti-corrosion cladding, and said second lining extending over a third length lying in the range twice the inside diameter of the pipe to 10 times the inside diameter of the pipe from said line of contact over that inside surface made of carbon steel of the unitary pipe element that is adjacent to said anti-corrosion cladding towards a second said end.

Implementing said first linings makes it possible to protect said carbon-steel first welds from corrosion, firstly by preventing any contact with the water conveyed by the pipe, and secondly by mechanically strengthening said first weld.

Said first length of said anti-corrosion cladding that is to be found on either side of said second weld of stainless steel or of corrosion-resistant alloy on the inside surface of said pipe makes it possible to inspect said anti-corrosion welds reliably by using ultrasound tests while also making the strength of said anti-corrosion welds more reliable.

Said first length of anti-corrosion cladding also enables the end that is to be welded with an anti-corrosion weld to be spaced apart sufficiently from the end of the corresponding one of said second linings covering the line of contact between anti-corrosion cladding and carbon steel, so that said end of said second lining is not damaged during said welding.

In addition, said second lining covering the line of contact between cladding and carbon steel enables the carbon-steel inside surface to be spaced apart from the surface of the cladding of stainless steel or of anti-corrosion alloy in contact with the water flowing in the pipe in operation, and thus makes it possible to prevent corrosion of the carbon steel in the vicinity of the line of contact due to the dissimilar-metal corrosion effect between the two materials when they are in contact at the line of contact and with the water.

In a particular implementation of the method of the invention, in step 1), at least one intermediate unitary pipe element is implemented between the two end unitary pipe elements of the string, said intermediate unitary pipe element having an inside surface made entirely of carbon steel not clad with a said stainless steel or with a corrosion-resistant alloy, and each end of said intermediate unitary pipe element being assembled by a said carbon-steel first weld either to a said second end of an end unitary pipe element or to an end of another intermediate unitary pipe element.

More particularly, in a method of the invention, a plurality of partial linings are implemented on the inside surface of the string by means of respective ones of a plurality of tubular liners made of a flexible plastics material that are applied against said inside surface of the string in discontinuous manner, the linings comprising:

said first linings covering the carbon-steel first welds between two contiguous unitary pipe elements assembled together in a same said string; and two said second linings covering each line of contact between firstly the cladding of said stainless steel or of said corrosion-resistant alloy at each end of the string and secondly the carbon steel of that portion of the inside surface of the unitary pipe element that is adjacent to each said anti-corrosion cladding.

The first, second, and third lengths are understood to be dimensions in the longitudinal direction (XX') of the end unitary pipe element.

The term "partial lining" is used to mean a lining that does not extend over the entire inside surface of the pipe, but rather that extends over a fraction only of its length, the various partial linings constituting discontinuous linings.

The term "end pipe elements" is used to mean the first and last pipe elements in a string.

It can be understood that:
said end unitary pipe elements are disposed such that their said first ends constitute the ends of the string;
the string can be made up of 2 unitary pipe elements, each of which is of the type having a said first end clad with said anti-corrosion alloy, or the string can include intermediate pipe elements between the two end pipe elements, which intermediate elements do not have said first ends; and
said line of contact is in fact the boundary of said first zone with the remainder of the inside surface of the end pipe element.

The remaining portions of the pipe firstly between two said first linings and secondly between each said second lining and the first lining that is closer to it are made of conventional carbon steel that is not clad with a liner or with an anti-corrosion alloy.

The method of the present invention is then particularly original and advantageous in that:
it makes it possible to perform the welding for most of the welds on land and on conventional steel pipes, i.e. on pipes that are not clad with corrosion-resistant alloy or steel; and
it requires implementation of partial linings only, over lengths that are relatively short, both at the conventional steel welds between the pipe elements that are pre-assembled on land in the form of strings, and also at the ends of the strings to be assembled together on the laying ship at sea. These partial linings do not require any specific anchoring at their ends.

More particularly, the method of the invention offers the following advantages:
by means of said first linings, the pipe is protected from corrosion of the carbon steel of said first welds;
by means of said second linings, the pipe is protected from galvanic corrosion of the carbon steel in the vicinity of the claddings of corrosion-resistant alloy or steel, which galvanic corrosion is due to a dissimilar-metal corrosion effect between the two grades of steel or alloy on being put into contact with the water conveyed in the pipe when they are too close together;
the number of welding and weld-protection operations that are performed on land is maximized, only said second welds with corrosion-resistant alloy or steel being performed on board the laying ship; and
the zones in which the inside diameter is reduced by lining with liners of a plastics material are limited.

Said first zone that is clad with corrosion-resistant alloy or steel extends over a first length necessary and sufficient so that:
firstly it is possible to weld the two strings together in step 2) without any risk of degrading said second linings due to the temperature implemented during said welding; and
secondly it is possible, subsequently, to inspect the welding quality of said second welds by ultrasound testing.

Each said second lining extends over a length necessary and sufficient to prevent galvanic corrosion of the carbon steel adjacent to said first zone by dissimilar-metal corrosion between said corrosion-resistant alloy or steel and the carbon steel of the inside surface of the pipe that is adjacent to said first zone while the water is flowing through the pipe in operation. And, that end of said second lining that is closer to said first end is such that said second lining is far enough way from said first end not to be degraded during said second welding due, in particular, to the high temperature implemented.

According to particular characteristics of the method of the invention:
said first cladding extends over a first length lying in the range 4 times the thickness of the wall of the pipe to 10 times the thickness of the wall of the pipe from said ends to be welded together by said anti-corrosion welds; and
each said second lining covers:
a portion of said anti-corrosion cladding that extends from said line of contact towards said first end over a second length $l_2$ lying in the range one eighth of the inside diameter of the pipe to the inside diameter of the pipe, and in particular in the range 10 mm to 100 mm, which length is sufficient to ensure that said lining is properly bonded with adhesive over said line of contact; and
a portion of the inside surface made of carbon steel that is adjacent to said anti-corrosion cladding and that extends from said line of contact towards said second end over a third length $l_3$ lying in the range 3 times the inside diameter of the pipe to 10 times the inside diameter of the pipe, and preferably 5 times said inside diameter.

The expressions "thickness of the wall of the pipe" and "inside diameter of the pipe" mean the thickness and the diameter of the main portions made of carbon steel of the unitary pipe elements as not clad with said cladding and with said lining.

Each of said first linings extends over a length on either side of said first welds sufficient to protect said carbon-steel first welds from corrosion by the water conveyed by the pipe in operation.

More particularly, each of said first liners for protecting the carbon-steel welds extends over a length $l_0$ lying in the range one fourth of the inside diameter of the pipe to twice the inside diameter of the pipe.

The expressions "thickness of the wall of the pipe" and "inside diameter of the pipe" mean the thickness and the diameter of the main portions made of carbon steel of the unitary pipe elements as not clad with said cladding and with said lining.

Advantageously, said first and second linings are implemented on the inside surfaces of said unitary pipe elements before they are assembled together.

Advantageously, in step 2), an end of a second string is assembled by a said anti-corrosion second weld to the end of a first string that is previously assembled at its other end to the end of a pipe that is being laid.

In order to make the ultrasound inspection by scanning acoustic means more reliable, the method of cladding with stainless steel or with anti-corrosion alloy is implemented by means of a plasma torch, the filler metal being constituted in powder form by a stainless steel or by an anti-corrosion alloy such as Inconel, the powder being conveyed in the gas of said plasma torch.

In a preferred version, the method used for cladding with anti-corrosion alloy or with stainless steel is melt plating by the Joule effect for depositing a strip of stainless steel or of anti-corrosion alloy, that method being known to the person skilled in the art as the "electroslag" technique. That method uses a strip having a width lying in the range 20 mm to 50 mm, and having a thickness lying in the range 0.5 mm to 1 mm. That strip is caused to melt, the energy necessary to melt the strip and the parent metal of the pipe being delivered by the Joule effect rather than by an electric arc, thereby radically minimizing the disruption of the interface between the parent steel of the pipe and the stainless steel or anti-corrosion alloy.

In this way, the plasma or the molten metal caused to melt by the electroslag technique generates a melt zone that is much more regular on the active surface than with a TIG torch associated with a filler metal, said plasma or electroslag molten metal making it possible for the interface between the parent steel and the filler metal to melt, without giving rise to the above-mentioned undulations, said undulations preventing the use of ultrasound for inspecting the welding.

In addition, the surface of the steel pipe on which the stainless steel or the anti-corrosion alloy is deposited should present a surface state of very high quality, so that the interface between the stainless steel or anti-corrosion alloy and the carbon steel of the pipe remains substantially cylindrical, of circular section, and uniform, at the end of the process.

Thus, firstly the bore is machined in the pipe with high precision over said first length, i.e. for example, about 150 mm, so as to obtain an excellent surface state, i.e., in practice, a shiny finish, corresponding to a surface state better than Ra=1.6 (Ra≦1.6), where Ra is apparent roughness, and then the cladding with stainless steel or with corrosion-resistant alloy is implemented, which cladding is then re-bored to the nominal inside diameter of the pipe, so as to obtain a good surface state.

In a preferred implementation, the method of cladding with stainless steel or with corrosion-resistant alloy comprises more precisely:
   boring the inside surface over a certain depth until a shiny finish is obtained; and
   using a plasma torch or electroslag strip melt plating by the Joule effect to deposit a said stainless steel or a said anti-corrosion alloy over a thickness greater than said depth of the bore; and then
   re-boring the surface of the deposit of said stainless steel or of said anti-corrosion alloy so as to plane its surface down to the same level as the adjacent surface of carbon steel not clad with said stainless steel or with said corrosion-resistant alloy.

The initial bore enables the inside surface of the pipe on which the stainless steel or corrosion-resistant alloy is deposited to present a surface state that is of very high quality so that the interface between the two grades of steel or alloy, i.e. between the parent carbon steel and the deposited corrosion-resistant alloy or steel, is substantially cylindrical and of substantially cylindrical section. In addition, deposition by plasma torch or by the electroslag technique makes it possible to obtain uniform and high-precision deposition. Thus, it is possible to inspect the weld by using precise and reliable ultrasound tests.

In a preferred implementation, said anti-corrosion cladding and said anti-corrosion second welds are implemented with a corrosion-resistant alloy of the Inconel type having a very high elastic limit and being fatigue-resistant, preferably Inconel of grade 625.

Advantageously, implementing said linings comprises a step of applying adhesive over the outside surface of said liners as tubular in shape outside the pipe before said liners are applied against the inside surface of the pipe.

Advantageously, said outside surfaces of the liners are pre-treated with an air cold plasma jet prior to application of the adhesive.

In a preferred embodiment, said liners are inserted as folded into the string after application of the adhesive, and then they are put back into the tubular shape by radial expansion and by the outside surface of each liner being pressed against the inside surface of the pipe, preferably by inflation under pressure or pressurization by means of a cylindrical bladder of length greater than the length of said liner, and previously inserted into said liner.

More particularly, after the adhesive is applied to them, said liners are folded longitudinally in such a manner as to present a cross-section having an outline that is kidney-shaped, and they are then inserted by means of a carriage into the pipe inside which they are put back into their tubular shape so as to be pressed against the inside surface of the pipe.

More particularly, the inside surfaces of said end pipe elements are treated by sand-blasting at the zones where said linings are to be implemented and before said linings are applied, and, where applicable, after said step for cladding with stainless steel or with anti-corrosion alloy.

More particularly, the inside surfaces of said end pipe elements are treated by sandblasting at the zones in which said first liners are to be implemented and prior to the operation whereby the pipe elements are welded together.

In known manner, said liners are made of materials chosen from polyurethane, epoxy, rubber, polypropylene, polyethylene, polyamide, fluoroelastomer and silicone.

The present invention also provides undersea pipes for bottom-to-surface links, at least a portion of each such pipe being obtained by implementing a method of the invention.

More particularly, the undersea pipes of the invention for bottom-to-surface links are catenary pipes of the SCR type extending in a catenary configuration, and at least one portion of each such pipe that includes the zone of contact with the bottom extends over at least 100 m, and preferably 200 m, over the bottom.

The present invention also provides an undersea pipe made of steel and designed to convey corrosive fluids, and in particular water, which pipe can be obtained by implementing the method of the invention, said undersea pipe being characterized in that it comprises a plurality of pipe strings assembled together by welding and made up unitary pipe elements that are assembled together by welding, said plurality of pipe strings comprising:
   a plurality of pipe strings that are assembled together at their ends by said anti-corrosion second welds of stainless steel or of corrosion-resistant alloy, and that are made up of said unitary pipe elements assembled together by said first welds of carbon steel;
   the inside surfaces of the ends of said strings assembled together by said second welds being provided with said anti-corrosion claddings of stainless steel or of corrosion-resistant alloy, said cladding extending from each said end over a first length $l_1$; and
   said first partial linings implemented by means of tubular liners made of a flexible plastics material being applied against said inside surface of the pipe, said first linings covering said carbon-steel first welds between contiguous unitary pipe elements that are assembled together in a same said string.

More particularly, the present invention provides an undersea pipe for a bottom-to-surface link that can be obtained by implementing the method of the invention, said undersea pipe being characterized in that it includes said second partial linings that are implemented by means of tubular liners made of flexible plastics material being applied against said inside surface of the pipe, each said second lining covering a respective line of contact between firstly a said anti-corrosion cladding and secondly the carbon steel of that portion of the inside surface of the unitary pipe element that is adjacent to a respective one of said anti-corrosion claddings, and each said second lining extending over a third length l₃.

More particularly, the present invention also provides pipes, each of which includes:
a plurality of said partial linings implemented on the inside surface of said string and constituted by respective ones of a plurality of tubular liners made of a flexible plastics material that are applied by adhesion bonding against said inside surface of the string in discontinuous manner, the linings comprising:
said first linings covering the carbon-steel first welds between two contiguous unitary pipe elements assembled together in a same said string; and
two said second linings covering each line of contact between firstly the cladding of stainless steel or of corrosion-resistant alloy and secondly the carbon steel of that portion of the inside surface of the unitary pipe element that is adjacent to each said anti-corrosion cladding.

More particularly, a pipe of the invention also includes a portion constituted by in the range 2 to 4 said strings that are assembled together, each said string being made up of in the range 2 to 4 unitary pipe elements that are of length in the range 5 m to 15 m.

BRIEF DESCRIPTION OF THE DRAWINGS

Other characteristics and advantages of the present invention appear from the following detailed description of implementations and embodiments, given with reference to FIGS. 1 to 7, in which:

FIG. 3 is a side section view of a string made up of four unitary pipe elements assembled together by welding;

FIG. 3a is a section and side view of a first lining installed in register with a carbon-steel weld performed in the workshop;

FIG. 3b is a section and side view of a second lining installed at each of the ends of said string;

FIGS. 4d and 4e are section and side views of the various stages of inserting a second lining at the end of a string;

FIGS. 5a, 5b, 5c, and 5d are section views of the various stages of preparing a second lining before it is inserted into the string;

FIGS. 6a and 6b are section views and FIGS. 6a' and 6b' are respectively corresponding side section views of the various stages of inserting a first lining at the join where two unitary pipe elements are assembled together by welding in the workshop;

FIG. 7a shows a string-laying ship equipped with a J-lay tower;

FIG. 7b is a side view of a pipe extending down to the sea bottom and held in tension at said J-lay tower, and a string held in the top portion of said J-lay tower, said string being on its approach for bringing it towards said pipe in suspension, with a view to being assembled by welding; and FIG. 7c is a side view of the two pipe portions; in the upper portion of the figure, the pipes are shown ready to be welded, and in the lower portion, the weld is finished.

DETAILED DESCRIPTION OF THE PREFERRED EMBODIMENTS

Figure 1:
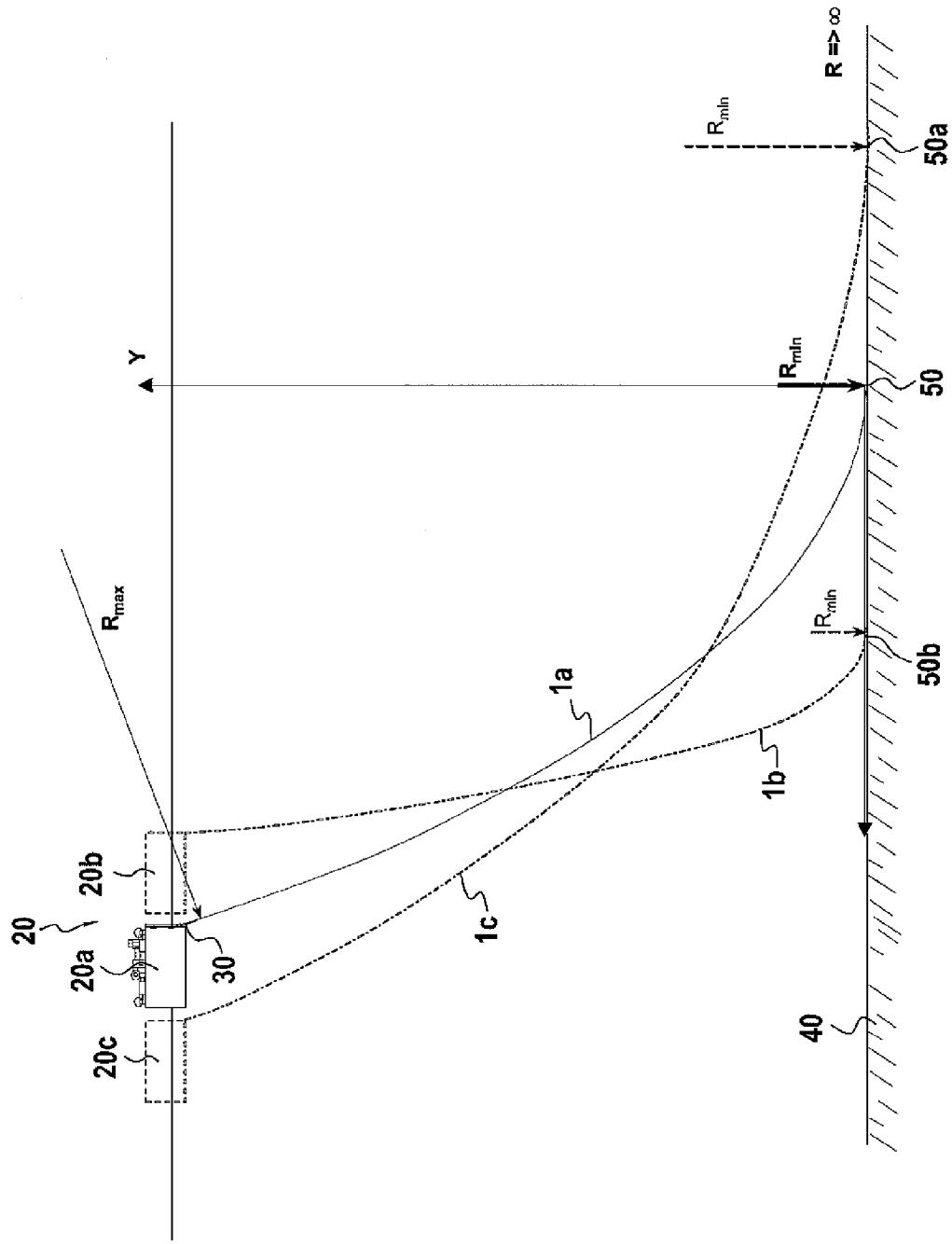
FIG. 1 is a side view of a pipe 1 in a single catenary configuration that is suspended from a floating support 20 of the FPSO unit type, and whose bottom end lies on the sea bottom 40, the pipe being shown in three different positions 1a, 1b, 1c.

FIG. 1 is a side view of a bottom-to-surface link 1 of the SCR type, suspended at 30 from a floating support 20 of the FPSO unit type, and lying on the sea bottom 40 at the contact point 50.

The curvature varies along the catenary from the surface, where its radius has a maximum value $R_{max}$, to a contact point, where its radius has a minimum valve $R_{min}$. Under the effect of waves, of wind, and of current, the floating support 20 moves, e.g. from left to right as shown in the figure, thereby causing the catenary pipe to be lifted off and put back down on the sea bottom. In the position $20_c$, the floating support shifts away from the normal position $20_a$, thereby tensioning the catenary $1_c$ while lifting it, and moving the contact point 50 rightwards. The radius of curvature $R_{min}$ at the foot of the catenary increases, as does the horizontal tension $H_a$ at said contact point, and as does the tension in the pipe at said floating support. Similarly, in the position $20_b$, the floating support shifting to the right causes the catenary $1_b$ to relax, and puts a portion of the pipe back down on the sea bottom. The radius $R_{min}$ at the contact point 50 decreases, as does the horizontal tension $H_b$ in the pipe at the same point, as does the tension in the pipe at said floating support. This reduction in radius of curvature 50b generates considerable internal stresses in the structure of the pipe, thereby generating cumulative fatigue phenomena that can lead to the ruin of the bottom-to-surface link.

Thus, the pipe presents a radius of curvature that is at its maximum at the top of the catenary, i.e. at the point of suspension 30 from the FPSO unit, and that decreases going down to the contact point 50 at which the pipe comes into contact with the bottom 40. At said contact point, the radius of curvature is at its minimum in the portion in suspension, but, in the adjacent portion lying on the sea bottom, since said pipe is ideally in a straight line, its radius of curvature is theoretically infinite. In fact, said radius is not infinite, because some residual curvature remains, but it is extremely high.

Thus, as explained above, as the floating support 20 moves on the surface, the contact point 50 moves leftwards and rightwards and, in the zone in which the pipe is lifted off or put back down on the bottom, the radius of curvature goes successively from a minimum value $R_{min}$ to an extremely high value, or even to infinity for an ideal configuration in which the pipe extends in a straight line.

This alternating bending gives rise to fatigue phenomena that are concentrated throughout the catenary foot zone, and the lifespan of such pipes is greatly reduced and is, in general, incompatible with the lifespans desired for bottom-to-surface links, i.e. in the range 20 years to 25 years, or even longer.

Figure 2:
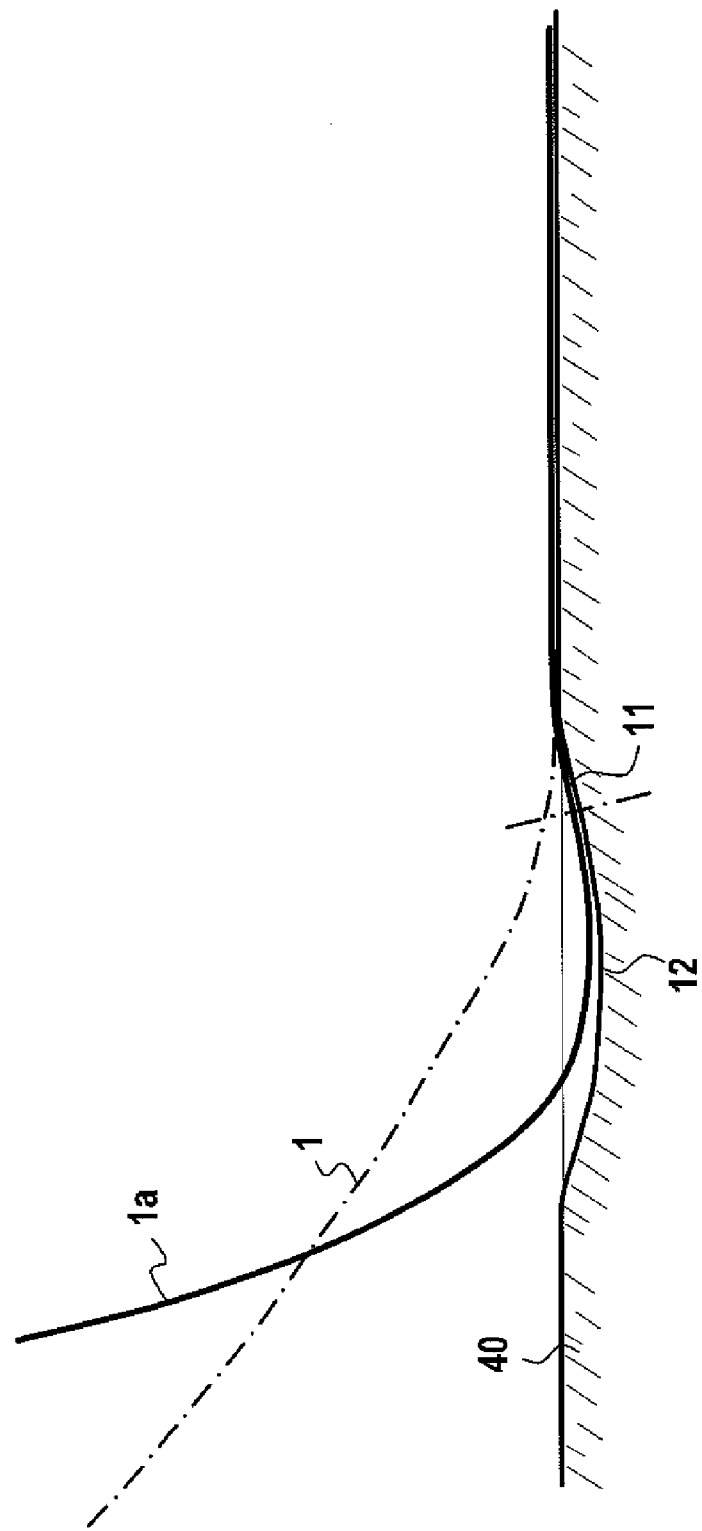
FIG. 2 is a side section view showing in detail the trench 12 dug out by the foot 11 of the catenary during the movements that lift the pipe off the sea bottom and that it put it back down thereon.
Figure 4A:
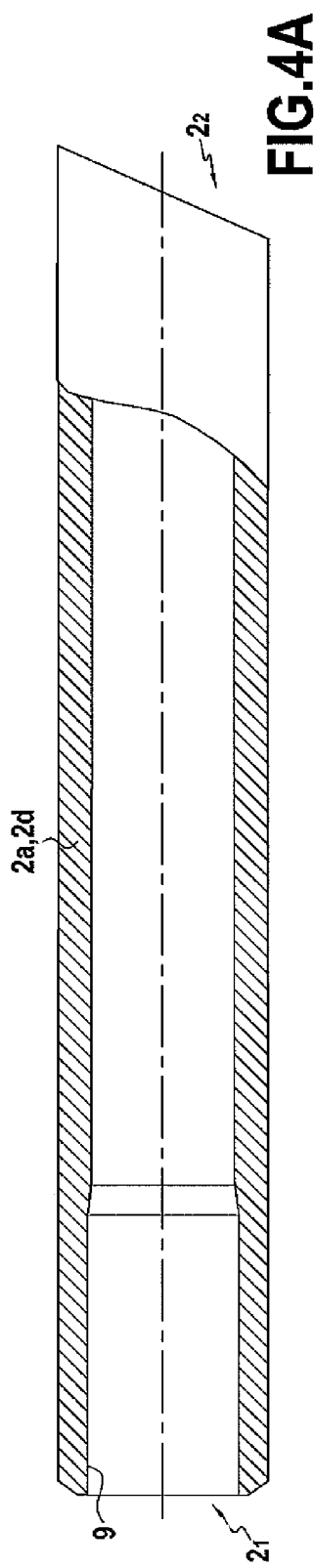
FIGS. 4a, 4b, and 4c are section and side views of the various stages of cladding the end of a string with a corrosion-resistant and fatigue-resistant alloy of the Inconel type.
Figure 4B:
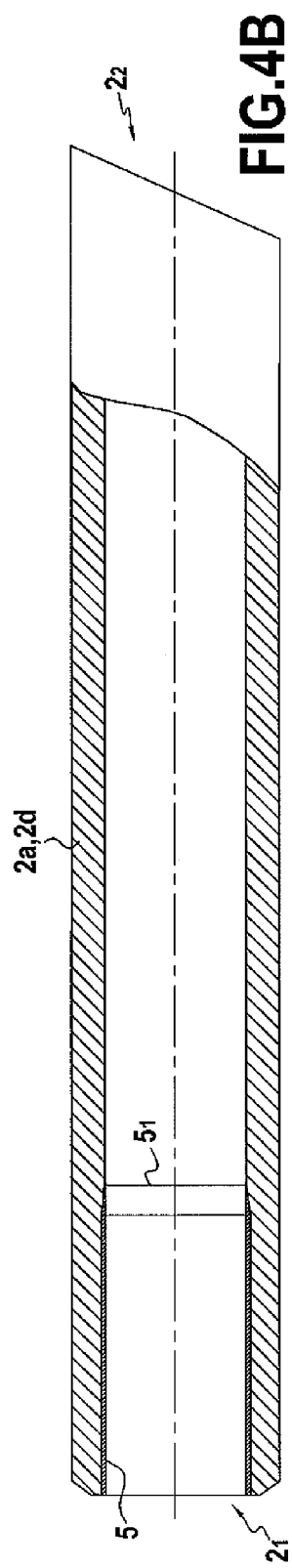
Figure 4C:
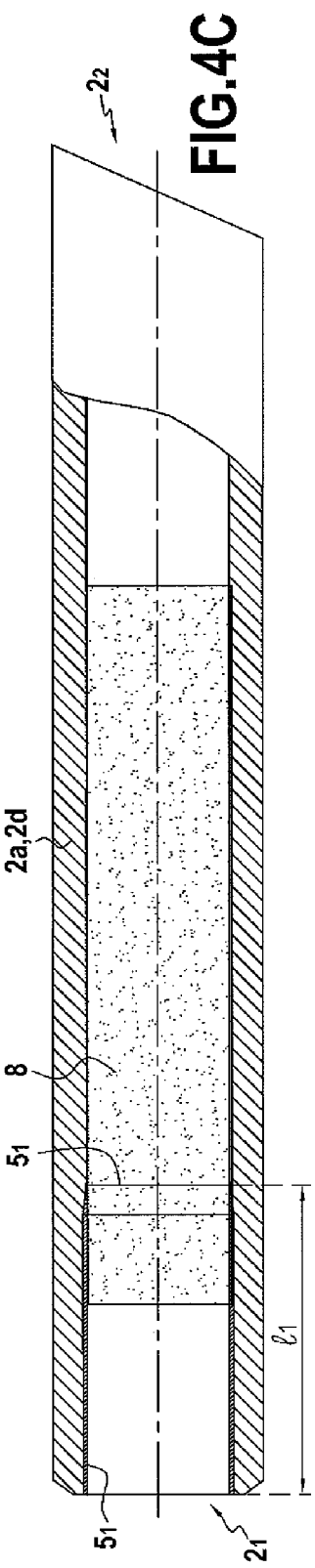

In addition, as shown in FIG. 2, it is observed that, during such alternating movements of the contact point, the stiffness of the pipe, associated with the above-mentioned residual curvature, causes, over time, a furrow 12 to be dug over the entire length lifted off and then put back down again, and thus causes a transition zone to be formed in which there exists a point of inflection 11 at which the curvature changes sign in the transition zones, and ultimately reaches an infinite value in the portion of undersea pipe that is lying in a straight line on the sea bottom, said portion being lifted off in exceptional manner only, e.g. when all of the disruptive elements (swell-wind-current) acting on the floating support and on the catenary accumulate to the maximum extent in the same direction (leftwards), or indeed when resonance phenomena appear in the catenary itself.

FIG. 3 shows a string $3a$, $3b$ made up of four unitary pipe elements $2a$ to $2d$ assembled together by welding that is performed in the workshop. The ends $3_1$, $3_2$ of said string are to be welded on board the laying ship 20 of FIG. 7 that is equipped with a J-lay tower 21. On board the ship, the strings are stored on the deck horizontally, and then they are raised one after another by the ramp 22 so as to be inserted into the J-lay tower. The pipe portion that is already laid is held under tension in the tower by a clamp with the previously assembled string $3a$ at a second end, then a new string $3b$ is lowered towards said pipe held in tension, as shown in detail in FIG. $7b$, and is finally welded to said pipe as shown in detail in FIG. $7c$.

FIG. $3a$ is a section and side view of two unitary pipe elements $2a$, $2b$ assembled together in the workshop by a conventional first weld $4_1$ of carbon steel, said first weld $4_1$ being protected from any contact with the fluid flowing in the pipe by a first lining $6_1$ whose outside wall is intimately bonded $7_1$ with adhesive to the inside wall of said string.

FIG. $3b$ is a section and side view showing the end of a string designed to be welded on board the J-lay tower of the laying ship by a weld of corrosion-resistant and fatigue-resistant alloy, said end being previously clad with the same alloy of the grade-625 Inconel type over a first length $l_1$, e.g. of 150 mm, and then covered in part by a second lining $6_2$ whose outside wall is intimately bonded with adhesive to the inside wall of said string, and that extends over a distance of a length $l_2+l_3$ of, for example, 2000 mm, so that the transition zone including and flanking the line of contact 5 between the parent carbon steel of the pipe and the corrosion-resistant and fatigue-resistant Inconel 625 alloy that has a very high elastic limit is protected from any contact with the fluid flowing through the pipe, thereby avoiding phenomena of galvanic corrosion or dissimilar-metal corrosion that occur in the presence of fluids including, inter alia, seawater, at said transition zone. The presence of this second lining $6_2$ makes it possible to space the two metals present apart to a considerable extent. As a result, the galvanic effect is reduced drastically or indeed to zero, the main risk of which effect is spot corrosion of the parent steel of the pipe, which corrosion can give rise to micro-cracks under dynamic bending stresses, and such micro-cracks can cause the pipe to break and the installations to be ruined.

In order to make the explanations clearer, the first and second linings $6_1$, $6_2$ are shown slightly separated from the wall of the string in the FIGS. $3a$ and $3b$, although they are shown as intimately bonded in FIGS. $4e$, $5d$, $6b$, $7b$, and $7c$.

FIGS. $4a$, $4b$, and $4c$ are section and side views of the end of a string at the various stages in the plasma cladding process for cladding said end with a corrosion-resistant and fatigue-resistant alloy that has a very high elastic limit, of the Inconel 625 type. As shown in FIG. $4a$, the end $2_1$ of the unitary pipe element is bored 9 so as to remove about 3 mm of steel in thickness over length $l_1$ of about 150 mm. This machining should result in an excellent surface state, of apparent roughness (Ra) of level 1.6, i.e. in a shiny finish. The inside of the pipe is then clad by means of a plasma, as shown in FIG. $4b$, the filler metal being conveyed by the gas in powder form. At the surface of the steel pipe, the plasma generates a weld pool of very thin thickness, in which weld pool the powder that is put into the molten state on passing through the core of the plasma increases the thickness of said pool so as to reach, finally, the thickness corresponding to the machining performed in the preceding step. The plasma torch effects regular back-and-forth movements, and the pipe is caused to move in rotation very slowly so as to cover, continuously, the entire periphery of the wall of the pipe, over said length of 150 mm. Then, after cladding, the inside of the pipe is re-bored so as to remove any traces of cladding and so as to re-adjust the diameter of the clad zone so that it corresponds to the diameter of the main portion of the string. Finally, the inside of the duct is sand-blasted 8 over about 1700 mm, the sand-blasted zone and said second lining $6_2$ starting at about a distance $l_4$ lying in the range 100 mm to 150 mm from the end of the unitary pipe element to be welded.

FIGS. $5a$ to $5d$ are section views showing the various steps of preparing and of putting in place the liners 7 of the first and second linings $6_1$, $6_2$. In FIG. $5a$, the outside surfaces of said liners 7 are prepared by means of an air cold plasma $7_2$ designed to clean and to activate the surface of said plastics liner prior to applying the adhesive $7_1$ by means of an adhesive-applicator head $7_3$, these two processes preferably being implemented on an automatic machine that is numerically controlled. Activating the surface of a plastics material of the liner makes it possible to break the surface molecules, thereby opening chemical bonds whose effect is to improve the performance of the adhesive bonding considerably. Air cold plasma equipment is available from Plasmatreat France. In order to make the explanations clearer, the film of adhesive $7_1$ is shown in dashed lines in said figures, but, in reality, said film $7_1$ is continuous over the entire surface of the liner.

Advantageously, the adhesives used are two-component adhesives such as epoxy-polyurethane adhesives that crosslink (cure) after the liners have been applied against the inside surface of the pipe.

As shown in FIG. $5b$, the liner 7 is flattened and folded longitudinally from the outside so as to impart a kidney shape $7a$ to said liner, it being necessary for said shape to fit entirely within the initial circular shape. In fact, after application of the adhesive, the liner must no longer be handled from the outside, but rather it should be handled from the inside, e.g. by means of suction-cup and vacuum devices $10_2$ that make it possible to hold it throughout the process of putting it in place inside the pipe. Then the liner 7 as folded into its kidney shape $7a$ is held in a carriage 10 by means of suction devices $10_2$ and is then inserted into the string until it reaches its final location. The suction device is then relaxed, and the liner then resumes its cylindrical shape and its outside wall comes to press intimately against the inside wall of the pipe in the zone that has been previously sand-blasted 8. In order to improve the strength of the adhesive bonding, a cylindrical bladder (not shown) is advantageously inserted into the lining, the length of said bladder being greater than the length of said lining $6_1$, $6_2$, and said bladder is pressurized to a high pressure, e.g. in the range 10 bars to 15 bars, so as to reabsorb any bubbles present in the film of adhesive, thereby guaranteeing excellent adhesive bonding between the lining and the pipe.

FIG. $4d$ shows in detail how the carriage 10 holding the liner 7 by means of suction devices $10_2$ is inserted. It is provided with bottom guide wheels $10_1$ and with side wheels (not shown), in such a manner as the second lining, as folded into a kidney shape, under no circumstances comes into contact with the wall of the pipe during the insertion stage. The second lining $6_2$ is then positioned so as to overlap the cladding 5 by a second length $l_2$ lying in the range 10 mm to 100 mm, e.g. about 5 cm, so as to guarantee good adhesive bonding beyond the boundary of contact $5_1$, and then the suction device $10_2$ is relaxed; the second lining then resumes its round shape. The carriage 10 is then withdrawn and it is replaced with said cylindrical bladder (not shown) that is maintained at a pressure that is preferably a high pressure lying in the range 10 bars to 15 bars ($10^6$ pascals (Pa) to $1.5 \times 10^6$ Pa) throughout the time required for cross-linking of the adhesive.

FIG. 6a is a section view, and FIG. 6a' is a corresponding side section view, showing insertion of a first lining $6_1$ that has had adhesive applied to it and that has been folded into a kidney shape using the procedure shown in detail in FIGS. 5a to 5d. Said first lining $6_1$ is held in the kidney shape by a suction device $10_2$ inside a motor-driven carriage 10 provided with guide wheels $10_1$, and is then inserted from one end $3_1$, $3_2$ of the string to reach, 12 m further along, the conventional weld $4_1$ performed in the workshop. The motor-driven carriage 10 is provided with a video camera (not shown) enabling the operator to adjust the position of the first lining $6_1$ in such a manner as to make said first lining overlap said workshop first weld $4_1$. The suction device $10_2$ is then relaxed, and the first lining then resumes its cylindrical shape (see FIGS. 6b and 6b'). The carriage 10 is then extracted and is replaced with a pressurized cylindrical bladder, in the same manner as for the second lining $6_2$.

FIG. 3 shows a string 3a, 3b made up of unitary pipe elements assembled together via their ends by carbon-steel welding, elements 2a and 2b being assembled together in this way, as are elements 2b and 2c, and elements 2c and 2d.

Each of the end unitary elements of the string 3a, 3b, namely the unitary pipe elements 2a and 2c has a first end $2_1$ designed to be assembled to the first end $2_1$ of another end unitary pipe element of another string by welding with the anti-corrosion alloy Inconel 625.

FIG. 3a shows how the first lining $6_1$ is put in place so that it overlaps the first weld $4_1$ and protects said first weld from corrosion and also from fatigue, the inside surface of each of the ends of the unitary pipe elements to be welded by means of a carbon-steel first weld $4_1$ being treated by sand-blasting in order to improve the adhesive bonding of the first linings $6_1$.

FIG. 3b shows the first anti-corrosion cladding zone 5 of length $l_1$ and made of Inconel 625 alloy at said first end $2_1$ of the end pipe element 2a, 2d corresponding to the ends $3_1$, $3_2$ of a string 3a, 3b. The line of contact $5_1$ between the cladding 5 and the steel main portion of the inside surface of the pipe element adjacent to the first cladding zone 5 is clad with a second lining $6_2$ that extends towards the other end $2_2$ of the end pipe element 2a, 2d over a length $l_3$ so that the portion of the anti-corrosion cladding 5 that is not lined and that is thus possibly in contact with the water conveyed by the pipe is spaced sufficiently far apart from the carbon-steel main portion $5_3$ that is not lined with said second lining $6_2$ at the other end of said second lining $6_2$ so as to avoid the corrosion effect or the dissimilar-metal corrosion effect when they are in contact with the water conveyed in the pipe.

FIGS. 7b and 7c show the approach for bringing together and then the welding for forming the second weld with an anti-corrosion alloy $4_2$ between the ends $3_1$, $3_2$ of respective ones of two strings 3b and 3a also corresponding to said first ends $2_1$ of the end unitary pipe elements, respectively 2d and 2a, of the respective strings 3a and 3b, the string 3a already being assembled at its end $3_1$ to the portion of the pipe that is already assembled and that is being laid on the J-lay tower 21, while its other end $3_2$ is being approached by the end $3_1$ of the new string 3b under assembly in FIG. 7b and being welded $4_2$ in FIG. 7c.

For unitary elements of length 6 m or 12 m and for strings of length in the range 24 m to 48 m with diameters lying in the range 150 mm to 600 mm, and with pipe thickness lying in the range 10 mm to 35 mm, the following lengths are implemented:

first lengths $l_1$ of anti-corrosion cladding 5 lying in the range 150 mm to 250 mm;

first linings $6_1$ of length $l_0$ lying in the range 200 mm to 300 mm;

second linings $6_2$ of length $l_2+l_3$ lying in the range 1000 mm to 2500 mm where $l_2$ lies in the range 10 mm to 100 mm, and preferably in the range 30 mm to 60 mm, of overlap on the cladding, and where $l_3$ lies in the range 990 mm to 2400 mm, and preferably in the range 1500 mm to 2000 mm, of overlap on the steel main portion of the inside surface of the pipe element adjacent to the cladding 5; and said second linings start sufficiently far away from the end to be welded $2_1$ of the end unitary pipe elements 2a, 2b to prevent said second linings from being degraded while the strings are being welded together, with this sufficient distance $l_4$ lying in the range 100 mm to 150 mm in practice;

the thickness of said claddings 5 lies in the range 2 mm to 5 mm; and the thickness of said first and second linings lies in the range 2 mm to 15 mm, and preferably in the range 3 mm to 5 mm.

The Inconel 625 presents the following composition: Cr 21.5% to 23%, Ni 63% to 65%, Mo 8.5% to 10%, Ta—Nb 3.45% to 4.15%, and Ti<0.4%, Al<0.4%, Fe<5%.

Without departing from the spirit of the invention, it is possible to imagine a pipe of the "pipe-in-pipe" type comprising coaxial inner and outer pipes and in which the inner pipe is assembled by welding and corrosion protection and fatigue protection of the present invention.

The invention claimed is:

1. A method of making steel undersea pipes designed to convey corrosive fluids including water, the method comprising:

1) acting in a workshop on land to assemble together respective ends of at least two unitary pipe elements by means of first welds so as to form pipe strings; and 2) acting at sea from a laying ship to assemble together respective ends of said strings by means of second welds so as to form a pipe;

wherein:

in step 1), said strings are made from at least two end unitary pipe elements, each of which has a first end designed to constitute one of the two ends of a said string, an anti-corrosion cladding made of stainless steel or of a corrosion-resistant alloy extending over the inside surface made of carbon steel of each said end unitary pipe element over a first length ($l_1$) of at least 4 times the thickness of the wall of the pipe, from said first end towards the second end of the end unitary pipe element, the inside surface of the remainder of each end unitary pipe element to the second end of the unitary pipe element being made of a carbon steel that is not clad with said stainless steel or with said corrosion-resistant alloy, and said second ends being assembled together by carbon-steel first welds;

prior to step 2), at least one first partial lining of the inside surface of said string is implemented by means of a tubular liner made of a flexible plastics material that is applied against said inside surface of the string, each said first lining covering each said carbon-steel first weld between the respective ends of the unitary pipe elements of the same string whose inside surface is made of the same carbon steel not clad with said stainless steel or with said corrosion-resistant alloy; and in step 2), said first ends are assembled together by second welds consisting of anti-corrosion welds performed with the same said stainless steel or with the same said corrosion-resistant alloy.

2. The method according to claim 1, wherein, prior to step 2), second partial linings are implemented by means of tubular liners made of flexible plastics material that are applied against said inside surface of the pipe element, each of said second linings covering the line of contact between firstly said anti-corrosion cladding of stainless steel or of corrosion-resistant alloy and secondly the carbon steel that is not clad with said anti-corrosion cladding of that portion of the inside surface of the unitary pipe element that is adjacent to said anti-corrosion cladding, and said second lining extending over a second length ($l_3$) lying in the range twice the inside diameter of the pipe to 10 times the inside diameter of the pipe from said line of contact over that inside surface made of carbon steel of the unitary pipe element that is adjacent to said anti-corrosion cladding towards a second said end.

3. The method according to claim 2, wherein a plurality of partial linings are implemented on the inside surface of the string by means of respective ones of a plurality of tubular liners made of a flexible plastics material that are applied against said inside surface of the string in discontinuous manner, the linings comprising:

said first linings covering the carbon-steel first welds between two contiguous unitary pipe elements assembled together in a same said string; and two said second linings covering each line of contact between firstly the cladding of said stainless steel or of said corrosion-resistant alloy at each end of the string and secondly the carbon steel of that portion of the inside surface of the unitary pipe element that is adjacent to each said anti-corrosion cladding.

4. The method according to claim 2, wherein said lining covering said line of contact between firstly the cladding of stainless steel or of corrosion-resistant alloy and secondly the carbon steel of that portion of the inside surface of the unitary pipe element that is adjacent to each said anti-corrosion cladding covers:

a portion of said anti-corrosion cladding that extends from said line of contact towards said first end over a third length ($l_2$) lying in the range one eighth of the inside diameter of the pipe to the inside diameter of the pipe; and a portion of the inside surface made of carbon steel that is adjacent to said anti-corrosion cladding and that extends from said line of contact towards said second end over the second length ($l_3$) lying in the range 3 times the inside diameter of the pipe to 10 times the inside diameter of the pipe.

5. The method according to claim 2, wherein each of said first linings is implemented to extend over a length lying in the range one fourth of the inside diameter of the pipe to twice the inside diameter of the pipe.

6. The method according to claim 1, wherein, in step 1), at least one intermediate unitary pipe element is implemented between the two end unitary pipe elements of the string, said intermediate unitary pipe element having an inside surface made entirely of carbon steel not clad with said stainless steel or with a corrosion-resistant alloy, and each end of said intermediate unitary pipe element being assembled by said carbon-steel first weld either to said second end of said unitary pipe element or to an end of another intermediate unitary pipe element.

7. The method according to claim 1, wherein said first cladding extends over a first length lying in the range 4 times the thickness of the wall of the pipe to 10 times the thickness of the wall of the pipe from said ends to be welded together by said anti-corrosion second welds.

8. The method according to claim 1, wherein, in step 2), an end of a second string is assembled by one of said anti-corrosion second welds to the end of a first string that is previously assembled at the other end to the end of a pipe that is being laid.

9. The method according to claim 1, wherein forming said anti-corrosion cladding comprises:

boring the inside surface over a certain depth; and using a plasma torch to deposit said stainless steel or said corrosion-resistant alloy over a thickness greater than said depth of the bore; and re-boring the surface of the deposit of said stainless steel or of said corrosion-resistant alloy so as to plane the surface down to the same level as the adjacent surface of carbon steel not clad with said stainless steel or with said corrosion-resistant alloy.

10. The method according to claim 1, wherein forming said anti-corrosion cladding comprises:

boring the inside surface over a certain depth;

using melt plating by the Joule effect to deposit a strip of said stainless steel or of said corrosion-resistant alloy over a thickness greater than said depth of the bore; and re-boring the surface of the deposit of said stainless steel or of said corrosion-resistant alloy so as to plane the surface down to the same level as the adjacent surface of carbon steel not clad with said stainless steel or with said corrosion-resistant alloy.

11. The method according to claim 1, wherein said anti-corrosion cladding and said anti-corrosion second welds are implemented with corrosion-resistant steel based on nickel.

12. The method according to claim 1, wherein implementing said linings comprises a step of applying adhesive over the outside surface of said liners as tubular in shape outside the pipe before said liners are applied against the inside surface of the pipe.

13. The method according to claim 12, wherein said outside surfaces of the liners are pre-treated with an air cold plasma jet prior to application of the adhesive.

14. The method according to claim 12, wherein said liners are inserted as folded into the string after application of the adhesive, and said liners are put back into the tubular shape by radial expansion and by the outside surface of each liner being pressed against the inside surface of the pipe, under pressure of a cylindrical bladder of length greater than the length of said liner, and previously inserted into said liner.

15. The method according to claim 14, wherein, after the adhesive is applied to said liners, said liners are folded longitudinally in such a manner as to present a cross-section having an outline that is kidney-shaped, and said liners are inserted by means of a carriage into the pipe inside which said liners are put back into the tubular shape so as to be pressed against the inside surface of the pipe.

16. The method according to claim 1, wherein the inside surfaces of said end pipe elements are treated by sand-blasting at the zones where said linings are to be implemented and before said linings are applied, and after said cladding with stainless steel or with corrosion-resistant alloy.

17. The method according to claim 1, wherein said liners are made of materials selected from the group consisting of polyurethane, rubber, epoxy, polypropylene, polyethylene, polyamide, fluoroelastomer and silicone.

18. An undersea pipe for a bottom-to-surface link, wherein at least a portion of said undersea pipe is obtained by implementing a method according to claim 1.

19. The undersea pipe for a bottom-to-surface link according to claim 18, wherein said undersea pipe is a catenary pipe of the steel catenary riser (SCR) type extending in a catenary configuration, said at least a portion including the zone of contact with the bottom and extending over at least 100 m over the bottom.

20. The undersea pipe for a bottom-to-surface link according to claim 18, wherein said undersea pipe includes a portion constituted by in the range 2 to 4 of said strings that are assembled together, each said string being made up of in the range 2 to 4 of unitary pipe elements that are of length in the range 5 m to 15 m.

21. The method according to claim 1, wherein said anti-corrosion cladding is made of a corrosion-resistant alloy based on nickel.

22. The method according to claim 1, wherein said first length ($l_1$) is in the range 4 times to 20 times the thickness of the wall of the pipe.

23. An undersea pipe made of steel and designed to convey corrosive fluids including water, said pipe obtained by implementing the method according to claim 1, wherein said undersea pipe comprises:

a plurality of pipe strings that are assembled together at ends of said plurality of pipe strings by said anti-corrosion second welds of stainless steel or of corrosion-resistant alloy, and that are made up of said unitary pipe elements assembled together by said first welds of carbon steel, wherein the inside surfaces of the ends of said strings are assembled together by said second welds being provided with said anti-corrosion claddings of stainless steel or of corrosion-resistant alloy that clad the carbon-steel inside surface at the ends of the unitary pipe elements or, where applicable, of the strings that are welded together by said weld of stainless steel or of corrosion-resistant alloy, said cladding extending from each said end over a first length ($l_1$); and wherein said first partial linings are implemented by means of tubular liners made of a flexible plastics material being applied against said inside surface of the pipe, said first linings covering said carbon-steel first welds between contiguous unitary pipe elements that are assembled together in a same said string.

24. The undersea pipe according to claim 23, wherein said undersea pipe includes second partial linings implemented by means of tubular liners made of flexible plastics material being applied against said inside surface of the pipe, each said second lining covering a respective line of contact between firstly said anti-corrosion cladding and secondly the carbon steel of that portion of the inside surface of the unitary pipe element that is adjacent to a respective one of said anti-corrosion claddings, and each said second lining extending over the second length ($l_3$) lying in the range twice the inside diameter of the pipe to 10 times the inside diameter of the pipe from said line of contact over that inside surface made of carbon steel of the unitary pipe element that is adjacent to said anti-corrosion cladding towards a second said end.

25. The undersea pipe according to claim 24 wherein said undersea pipe includes:

a plurality of said partial linings implemented on the inside surface of said string and constituted by respective ones of a plurality of tubular liners made of a flexible plastics material that are applied by adhesive bonding against said inside surface of the string in discontinuous manner, the linings comprising:

said first linings covering the carbon-steel first welds between two contiguous unitary pipe elements assembled together in a same said string; and two said second linings covering each line of contact between firstly each said anti-corrosion cladding and secondly the carbon steel of that portion of the inside surface of the unitary pipe element that is adjacent to each said cladding.

26. The undersea pipe according to claim 23 including a portion constituted by in the range 2 to 4 of said strings that are assembled together, each said string being constituted by in the range 2 to 4 of said unitary pipe elements that are of length in the range 5 mm to 15 m.

* * * * *